US006956661B2

(12) United States Patent
Tutschke

(10) Patent No.: US 6,956,661 B2
(45) Date of Patent: Oct. 18, 2005

(54) DEVICE FOR MEASURING EXTERNAL AND INTERNAL DIMENSIONS AND DISTANCES BETWEEN MEASUREMENT OBJECTS

(76) Inventor: Udo Tutschke, Tunxdorfer Schleife 2, D-30539 Hannover (DE)

(*) Notice: Subject to any disclaimer, the term of this patent is extended or adjusted under 35 U.S.C. 154(b) by 0 days.

(21) Appl. No.: 11/004,237

(22) Filed: Dec. 6, 2004

(65) Prior Publication Data

US 2005/0140989 A1 Jun. 30, 2005

Related U.S. Application Data

(63) Continuation of application No. PCT/EP03/05810, filed on Jun. 4, 2003.

(30) Foreign Application Priority Data

| Jun. 6, 2002 | (DE) | ................................ 102 25 376 |
| Jul. 3, 2002 | (DE) | ................................ 102 29 810 |
| Nov. 28, 2002 | (DE) | ................................ 102 55 533 |
| May 21, 2003 | (DE) | ................................ 103 22 907 |

(51) Int. Cl.[7] .......................... G01B 11/02; G01B 11/04
(52) U.S. Cl. ...................... 356/639; 356/625; 356/629; 356/640
(58) Field of Search ................................ 356/601–640; 250/237 R, 201.2, 201.3, 559.27, 559.28, 250/559.29

(56) References Cited

U.S. PATENT DOCUMENTS

| 4,357,085 A | * | 11/1982 | Niwa et al. .................... 396/80 |
| 4,548,504 A | * | 10/1985 | Morander .................... 356/623 |
| 4,775,204 A | * | 10/1988 | Setani ......................... 359/201 |
| 4,938,589 A | * | 7/1990 | Breithaupt .................. 356/3.05 |
| 4,963,023 A | | 10/1990 | Goldovsky et al. |

FOREIGN PATENT DOCUMENTS

| DE | 240 777 A1 | 11/1986 | |
| DE | 38 16 322 C2 | 11/1989 | |
| DE | 3816322 A1 | * 11/1989 | ........... G01B 11/02 |
| GB | 2 278 434 A | 11/1994 | |

OTHER PUBLICATIONS

International Search Report dated Sep. 12, 2003 in International Application No. PCT/EP03/05810 filed Jun. 4, 2003 (5 pages).

* cited by examiner

*Primary Examiner*—Gregory J. Toatley, Jr.
*Assistant Examiner*—Sang H. Nguyen
(74) *Attorney, Agent, or Firm*—Shlesinger, Arkwright & Garvey LLP

(57) ABSTRACT

Device measures external and internal dimensions of measurement objects using a light source for illuminating a slit diaphragm, in front of or behind which a spirally slotted disc is arranged, slit diaphragm and disc being rotatable in relation to each other and the disc having a spiral slot intersecting the slit of the slit diaphragm, the interaction of which with the slit creates a hole aperture. Evaluation device measures the time in which the light beams scan the measurement object and determines dimensions from the measured times. To scan the measurement object simultaneously in different spacial planes or in one plane in different axes, several slits are provided in the slit diaphragm. Slits may be disposed radially around axis of rotation. Light source(s) may emit light of one or more wavelengths or different frequency modulated light amplitudes.

10 Claims, 5 Drawing Sheets

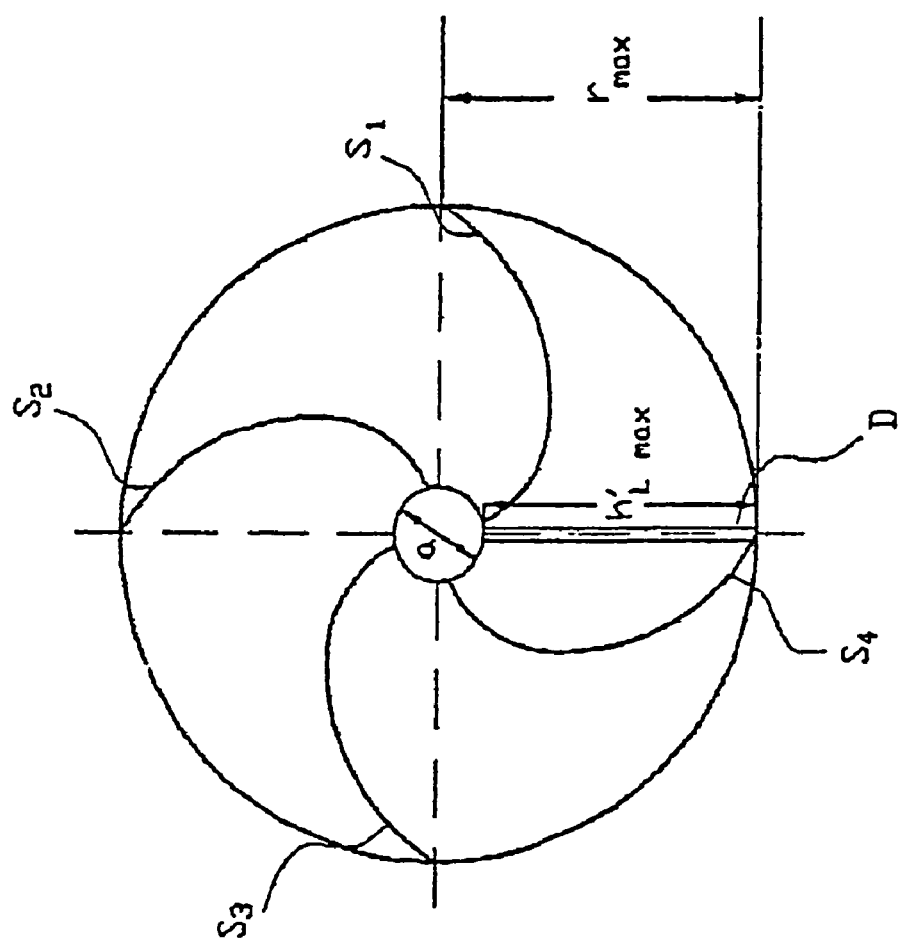

DEVICE FOR MEASURING EXTERNAL AND INTERNAL DIMENSIONS AND DISTANCES BETWEEN MEASUREMENT OBJECTS

CROSS REFERENCE TO RELATED APPLICATIONS

This application is a continuation of international application no. PCT/EP03/05810, filed Jun. 4, 2003, and this application claims the priority of German application no. 102 25 376.5, filed Jun. 6, 2002, and this application claims the priority of German application no. 102 29 810.6, filed Jul. 3, 2002, and this application claims the priority of German application no. 102 55 533.8, filed Nov. 28, 2002, and this application claims the priority of German application no. 103 22 907.8, filed May 21, 2003, and each of which is incorporated herein by reference.

FIELD OF THE INVENTION

The invention relates to a device for measuring external and internal dimensions and the distances between parts of measurement objects.

Such a device is known, as set forth in DE 38 16 322. It is designed through the use of only one half of the measuring field for small measurement objects, the optical scanning being performed in only one plane and in one measuring axis. The measuring frequency is limited by the rotational speed of the mechanical components (spirally slotted disc).

OBJECTS AND SUMMARY OF THE INVENTION

An object of this invention is to improve the device of the type stated at the beginning in such a way that measurement objects can be simultaneously scanned in different spatial planes or in one plane in different axes and/or a multiplication of the measuring frequency can be achieved.

This object is solved by the invention.

In the case of the device according to the invention, the measuring of dimensions and distances between measurement objects is reduced to a time measurement. The device measures the time required for a light spot to pass through a given distance bounded by two edges or similar. This distance is, for example, the outside or inside diameter of a measurement object, but can also be the distance between two objects. In the device according to the invention, a beam that can be moved parallel to itself is generated by a slit diaphragm and a rotating disc disposed behind it, said disc having spiral slots. The position of the beam moving parallel to itself obeys the law $s = c \cdot \phi$, $\phi$ being the angle of rotation of the spirally slotted disc and c being a constant. The spiral slot masks out a narrow beam of light from the parallel pencil of rays passing through slit D, which appears practically to be a spot of light. By rotating disc DS, the intersection of the spiral slot with the slit, said intersection representing a hole aperture LB, moves along the slit. As a result, the light beam or light spot moves periodically at constant speed from bottom to top or vice versa according to the direction of rotation of the disc. The spiral slot obeys the equation for an Archimedean spiral with radius $r = c \cdot \phi$, where $c = V_L/\omega$, $V_L$ being the speed of movement of the light beam or light spot, $\omega$ being the angular velocity of the rotating spirally slotted disc DS and $\phi$ the angle of rotation of disc DS.

If disc DS, according to an advantageous development of the invention, is provided with several spiral slots that have an equidistant angular spacing from each other, the intersection of the spiral slot with the slit will for each revolution of the disc move repeatedly along the slit periodically from bottom to top or from top to bottom.

The proposed measuring method is linear so that neither an additional component nor software expenditure is required to achieve linearisation. The invention enables simultaneous optical scanning of the measurement object in different spatial planes or in different axes of one plane with no major additional technical expenditure. A high level of measurement accuracy of around 1 µm is possible. The measurement object can be arranged at any point within the measuring field; the measuring field corresponds to roughly twice the maximum distance of the spiral slot from the centre point of the spiral slot or the spirally slotted disc. Linearity prevails over the entire measuring field and in the entire measuring range. Since the shade time is determined according to the invention and not the light intensity outside and inside the shadow, transparent objects can be measured without knowing the transmission ratio. The measuring sensitivity and measuring accuracy are maintained irrespective of the size of the measurement object. Through just minor technical measures for increasing the frequency of measurement, a relatively high scanning frequency of around 1 kHz and more can be achieved. The entire measuring unit (light source, measuring field, receiver) can, in principle, be of very small construction, but is also suitable for measuring large measurement objects such as large tubes. The requirements placed on the means of light field generation and light beam detection are only minor, so that the measuring device according to the invention can be manufactured at a reasonable price.

Main applications of the invention include, but are not limited to, the monitoring of production processes in the metal-working, plastics processing and rubber processing industries. The measuring device according to the invention can also be used as control instrument for high-precision production in the workshop.

The invention is explained below in greater detail with the help of the attached drawings in which practical examples are illustrated.

Relative terms such as up, down, left, and right are for convenience only and are not intended to be limiting.

BRIEF DESCRIPTION OF THE DRAWINGS

FIG. 6 shows diagrammatically an embodiment for increasing the number of generating systems, said embodiment having a disc with four spiral slots.

DETAILED DESCRIPTION OF THE INVENTION

Figures 1, 2:
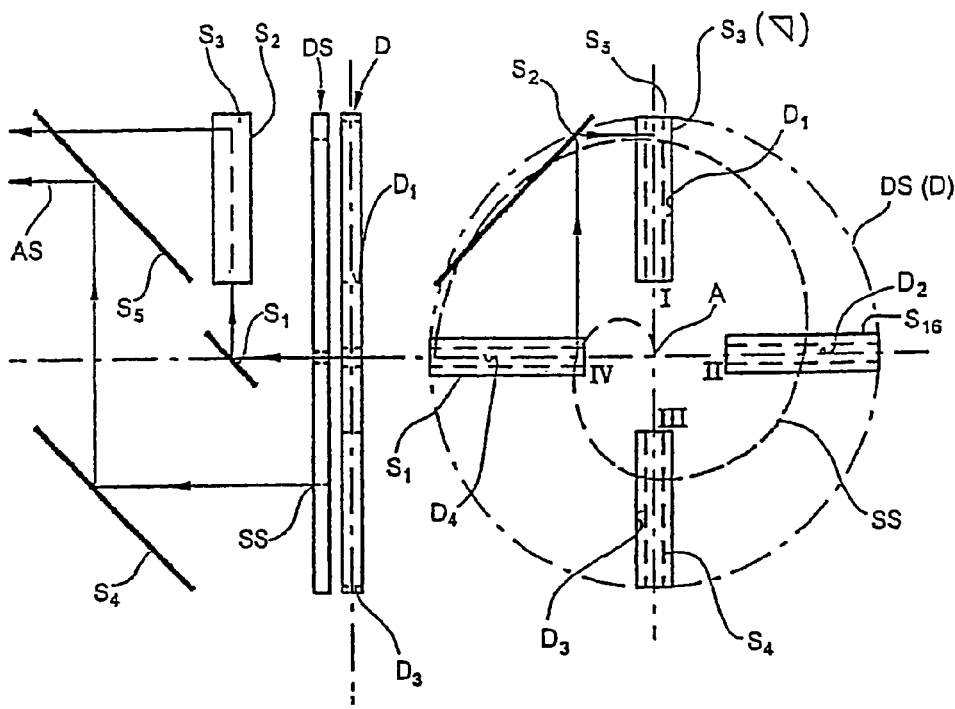
FIGS. 1 and 2 show a side view and a rear view of four generating systems (arrangement of light source, slit diaphragm and spirally slotted disc), the optical components and beam path for only two generating systems (IV and III) being shown in the diagram.

Components that are identical and correspond to each other in the figures of the drawing are provided with the same reference symbols.

According to the basic principle of the measuring device according to the invention, the scanning rate is limited by the maximum rotational speed of spirally slotted disc DS. The scanning rate can be increased by increasing the number m of generating systems. The following formula is true:

Scans/second=m·revolutions/second

The number m of generating systems can be increased by increasing a) the number n of slits that together with the spiral slot form moving hole apertures with each revolution of the disc and/or b) the number k of spiral slots that together with a slit form moving hole apertures with each revolution of the disc.

The example below explains in greater detail the quadrupling of the scanning rate according to a) with reference to FIGS. 1–5.

Figures 3, 4:
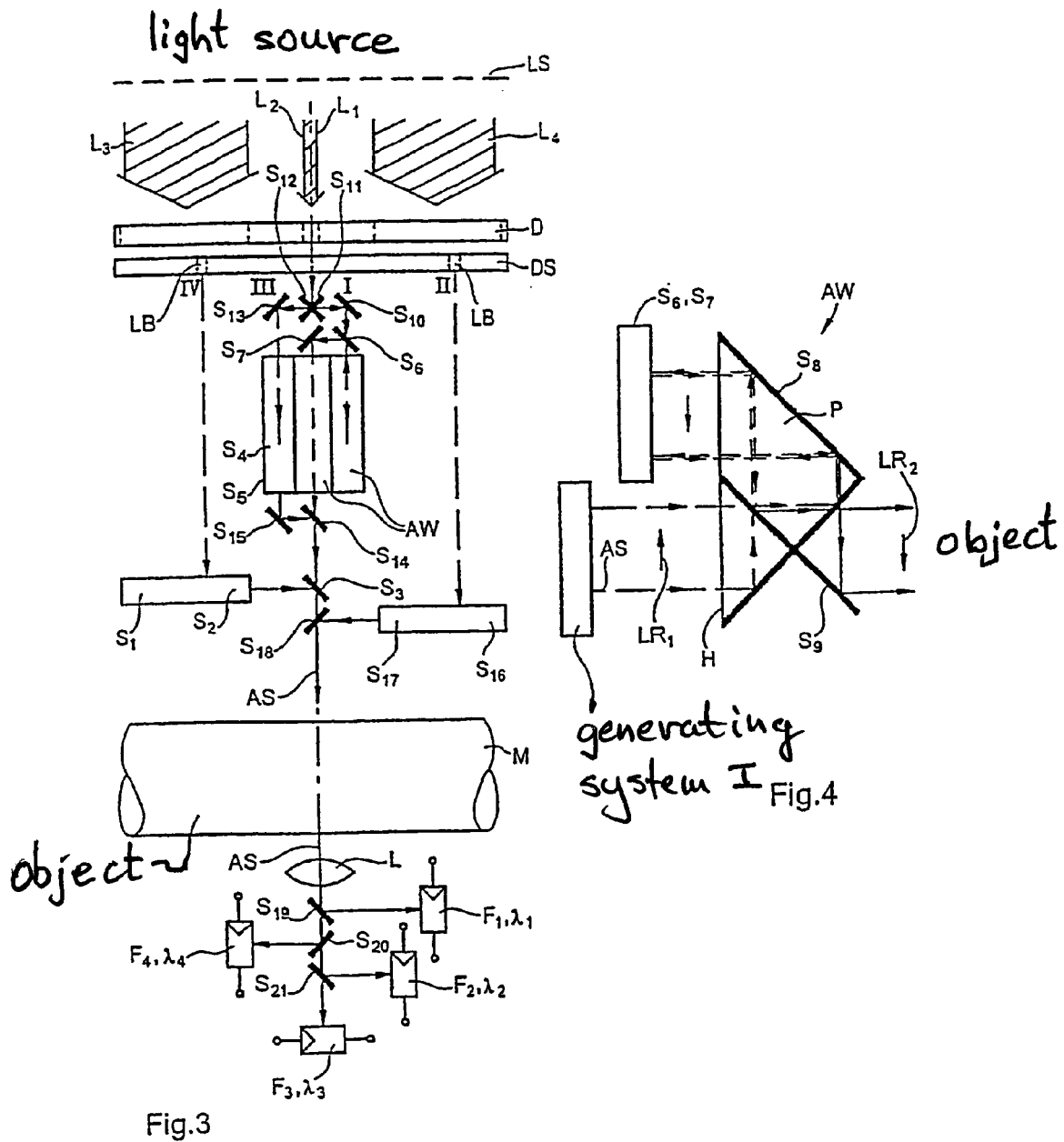
FIG. 3 shows an arrangement of optical components and beam path in the top view for an increase in scanning rate by a factor of four.
FIG. 4 shows diagrammatically a scanning direction changer.

FIGS. 1–3 show a device for measuring external and internal dimensions and distances between measurement objects (M). The device includes four light sources $L_1$, $L_2$, $L_3$ and $L_4$ and at least one lens system (LS) for generating a parallel pencil of light rays from the light beams of the light sources. The parallel pencil of light rays fall onto a slit diaphragm D with four slits $D_1$, $D_2$, $D_3$ and $D_4$ in front of which when viewed from the direction of illumination is disposed a spirally slotted disc DS that rotates around an axis of rotation A. The lens system (LS) for generating a parallel beam of light can, as shown in FIG. 3, be disposed in front of the slit diaphragm/spirally slotted disc arrangement (D/DS), or even behind it in order to render the scanning beams parallel. Disc DS has a spiral slot (SS) that has the form of an Archimedean spiral and intersects the slit of the slit diaphragm, the said spiral obeying the equation $r=c\cdot\phi$, r being the radius of the spiral, c being the quotient of the scanning rate $V_L$ of the light beam or light spot and the angular velocity $\omega$ of the rotating disc ($c=V_L/\omega$) and $\phi$ being the angle of rotation of the disc. The interaction of the slit and spiral slot creates a hole aperture LB, which, upon rotation of the disc at constant speed, moves along the slit at constant speed. The device moreover includes four photodiodes $F_1$, $F_2$, $F_3$, $F_4$ onto which are directed the light beams AS passing through the hole aperture and scanning the measurement object. The measurement object M is, when viewed from the direction of illumination, arranged in front of the hole aperture. The output signals of the photodiodes are fed to an evaluation unit (not shown) that measures the time in which the light beams scan the measurement object and from the measured times calculates the external and internal dimensions and the distance between measurement object or measurement objects, said dimensions and distances being proportional to the measured times.

The four slits $D_1$, $D_2$, $D_3$, $D_4$ of slit diaphragm D are disposed radially to the axis of rotation A. There is provided for each slit a light source $L_1$, $L_2$, $L_3$, $L_4$ that emits light with light source-specific characteristics, e.g. light with different wavelengths $\lambda_1$, $\lambda_2$, $\lambda_3$, $\lambda_4$ or light of one wavelength with different frequency modulated light amplitudes $LA_1$, $LA_2$, $LA_3$, $LA_4$.

In the case of the device according to FIGS. 1–3, four generating systems I, II, III, IV are therefore provided. Each generating system consists of a light source, a slit of the slit diaphragm and the common spirally slotted disc DS.

The scanning light beam of generating system III is reflected with mirrors $S_4$ and $S_5$ and the scanning light beam of generating system IV is reflected with mirrors $S_1$, $S_2$ and $S_3$ into the beam plane of generating system I. The optical components of generating systems I and III are not shown for reasons of clarity. The optical components and the beam path for generating system II are disposed axially symmetrical to system IV.

FIG. 3 shows that for a quadrupling of the scanning rate four light sources with light source-specific characteristics, e.g. with wavelengths $\lambda_1$, $\lambda_2$, $\lambda_3$, $\lambda_4$ are used. The scanning light beam of generating system I with wavelength $\lambda_1$ is directed with the help of a mirror $S_{12}$ and via a mirror $S_{10}$ onto a scanning direction changer AW. The scanning direction changer consists as shown in FIG. 4 of an isosceles-rectangular prism P onto whose hypotenuse surface H the scanning light beam AS falls perpendicularly, the scanning direction $LR_1$ of which is reversed by 180°-deflection of the beam path. The directionally reversed scanning light beam emerging from the prism is directed by two mirrors $S_6$ and $S_7$ inclined to each other at an angle of 90° onto a parallel mirror arrangement $S_8$, $S_9$, which diverts the directionally reversed scanning beam (scanning direction $LR_2$) into the plane of the incident scanning light beam, i.e. back into the beam plane of system I. The beam passes, in the direction of the measurement object, partially transparent mirrors $S_{14}$, $S_3$ and $S_{18}$.

Figure 5:
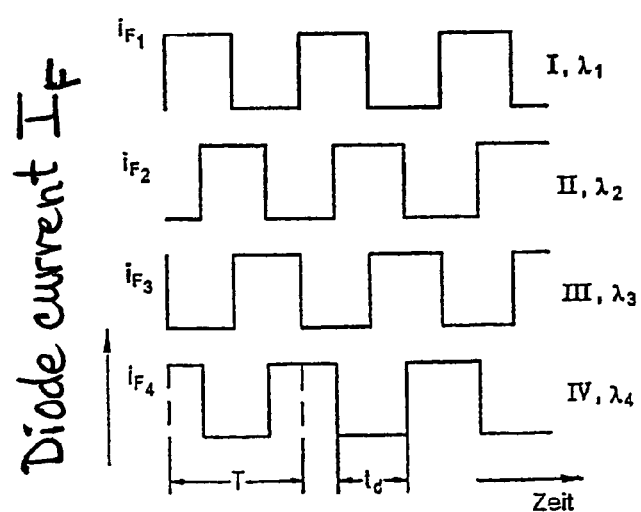
FIG. 5 shows signal currents of photodiodes when the spirally slotted disc rotates in a clockwise direction and gives the period T=duration of a revolution of the spirally slotted disc and the time $t_d$ in which the scanning light beam scans the diameter of the measurement object.

The scanning light beam of generating system III with wavelength $\lambda 3$ is directed with mirrors $S_{11}$, and $S_{13}$ into a parallel mirror arrangement $S_4$, $S_5$, see FIGS. 1 and 3, raised and reflected with mirrors $S_{15}$ and $S_{14}$ into the beam plane of system I. The scanning light beams of systems II and IV with wavelengths $\lambda_2$ and $\lambda_4$ also pass (see FIGS. 1–2) with the help of mirrors $S_{16}$, $S_{17}$, $S_{18}$ and $S_1$, $S_2$ and $S_3$ into the beam plane of system I. All four scanning light beams scan measurement object M at the same point at a time interval of T/4. Behind the measurement object, the beams of the four exactly superimposed measuring fields are focussed by a simple lens system L to spot size. If the emitter or light source specific characteristics are different wavelengths, these are separated according to wavelength with the help of mirrors $S_{19}$, $S_{20}$ and $S_{21}$, whose reflection is wavelength dependent, and directed onto photodiodes $F_1$, $F_2$, $F_3$, $F_4$. If the light source specific characteristics are different frequency modulated light amplitudes, signal separation is achieved electronically by means of frequency filters after the diode, said diode receiving light from all four emitters or light sources, in the electronic evaluation device. The signal currents of the photodiodes or, as the case may be, after frequency separation in the evaluation device, are shown in FIG. 5. It is apparent from this that in the time interval T/4 a measured value proportional to the shade time $t_d$ is generated. If spirally slotted disc DS rotates in a clockwise direction, the diameter signals are generated in succession by the generating systems III, IV, I, II, III, IV, I etc. If in practice a means of determining the diameter is sufficient in which the scanning beams of the individual generating systems can each be axially displaced from each other by a few millimeters on the object side, measurement with light of only one characteristic is sufficient, for example only one wavelength. The measuring field can be doubled according to FIG. 6 by directing the measuring field between $F_{18}$ and the measurement object in FIG. 3 by means of a beam splitter perpendicular to the longitudinal axis of the measurement object onto a mirror that reflects the second measuring field ($x_2$) that adjoins the second measuring field ($X_1$) into the measuring axis of the first measuring field. In this case, the components shown in FIG. 3 at the receiver end must be doubled and the signals with the same light source characteristics ($\lambda$) combined as the output signal of the diameter $d_\lambda = x_{1'\lambda} + X_{2'\lambda} X_{1'\lambda}$ and $X_{2'\lambda}$ being scanned sections of the object.

According to the above formula (scans/second=m·revolutions/second), a further increase in the scanning rate can be achieved by increasing the number m of generating systems, on the condition that the slits on the circumference of the slit diaphragm (D) positioned in front of the spirally slotted disc are equidistant from each other. The number of generating systems can be increased by providing further slits in the slit diaphragm radially disposed starting from axis A at the same angular spacing from each other. The number of generating systems in this case is the same as the number of slits. Additional generating systems can significantly extend the functions and breadth of application of the described device, e.g. by the recording of external dimensions in different planes or in different axes of one plane and the combination of increase in measuring frequency and measuring axes, the following equation being true:

Number of generating systems m=i·j where i=the number of generating systems required to increase the measuring frequency=multiplication factor of the basic measuring frequency (revolutions/second) and j= the number of generating systems required to increase the number of measuring axes or measuring planes.

The following sets out to explain the quadrupling of the scanning rate with the help of a disc, which according to variant b) described above (e.g., the number k of spiral slots that together with a slit form moving hole apertures with each revolution of the disc), has k spiral slots.

The spiral slot in disc DS is mathematically described by $r = c \cdot \phi$ (1) and $c = V_{Lp}/\omega$ is true. If $V_{Lp} = h_{Lmax} \cdot n/60$ [m/sec] (n=revolutions/minute) is used for the light spot velocity and $\omega = 2\pi \cdot n/60$ [sec] for the angular frequency, then $r = (h_{Lmax}/2\pi) \cdot \phi$ (2) with the gradient $c = h_{Lmax}/2\pi$; $h_{Lmax}$=maximum light spot travel.

The distance of the light spot from the centre point of the spiral is greatest after a disc revolution $\phi = 2\pi$, so that $r_{max} = h_{Lmax}$ is true. If in disc (DS) k spiral slots are provided, between which the angular spacing $\phi k$ is constant, and $r_{max} = h_{Lmax}$ is to be reached after $\phi = 2\pi/k$, then the following must be true $r_{max} = (k \cdot h_{Lmax}/2\pi) \cdot 2\pi/k$ and the spiral equation for $0 \leq \phi \leq 2\pi/k$ is $r = (k \cdot h_{Lmax}/2\pi) \cdot \phi$ (3)

E.g. four equidistant spirals are required in the disc to achieve a quadrupling of the scanning rate (FIG. 6), said spirals having a quadruple gradient $c = 2 \cdot h_{Lmax}/\pi$ according to (3). In FIG. 6, the maximum light spot travel is reduced by the minor radius a/2. In functional terms, k or, in the example, 4 scanning beam generating systems are created for each revolution of the disc and for each slit. If slits n and spiral slots k are functionally combined as stated above, then the following is true:

Scans/second=k·n·evolutions/second

Figure 7:
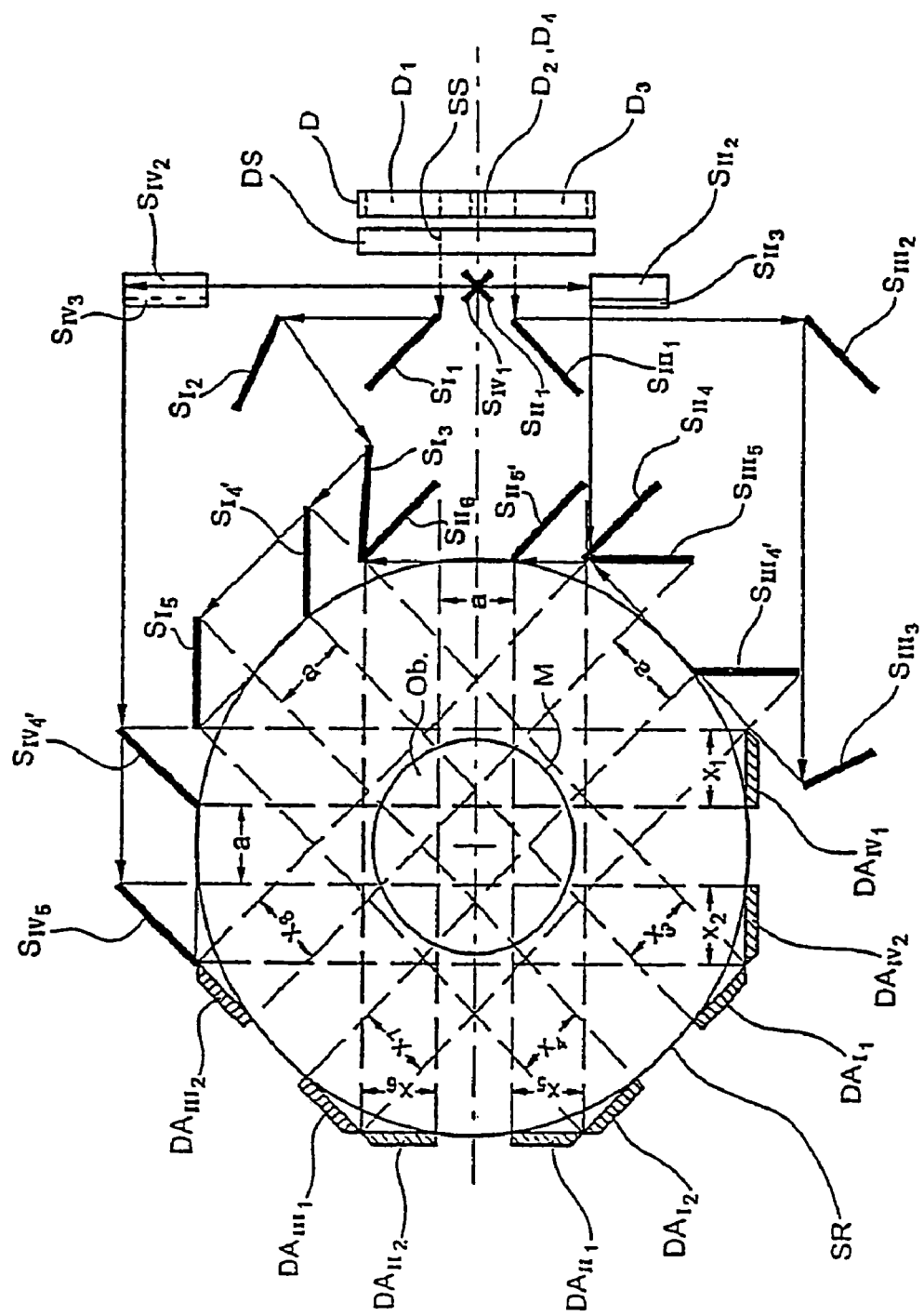
FIG. 7 shows a side view of an embodiment for measuring with four generating systems in one plane in four axes.

FIG. 7 describes a device for simultaneous recording of external measurements in different planes or one plane in different axes. Each scanning beam generating system of the measuring device can be used to measure external dimensions in one plane, so that, as a general rule, the following is true:

Number of measuring planes or measuring axes= Number of generating systems.

FIG. 7 shows how four scanning beam generating systems I–IV in one plane can be used to measure four tube diameters in four axes, for example for the measurement of the ovality of a tube. The scanning light beam generating systems I, II, III and IV are identifiable from slits $D_1$, $D_2$, $D_3$ and $D_4$ of slit diaphragm D as well as spirally slotted disc DS. Light of system I falls on mirrors $S_{I\,1}$, $S_{I\,2}$ and $S_{I\,3}$ and a beam splitter $S_{I4'}$ (50% transmission), which divides the beam with the help of mirror $S_{I\,5}$ onto measuring fields $x_3$ and $x_4$. Light of system II is directed with the help of mirror $S_{II\,1}$ onto a mirror combination $S_{II\,2}/S_{II\,3}$, which aligns the beams parallel with the spirally slotted disc and then perpendicularly with a mirror holding ring SR and the measurement object M. Mirror $S_{II\,4}$ directs the scanning beam onto beam splitter $S_{II\,5'}$, which divides the beam with the help of mirror $S_{II\,6}$ onto measuring fields $x_5$ and $x_6$. Light of system III is directed with the help of mirrors $S_{III\,1}$, $S_{III\,2}$ and $S_{III\,3}$ to beam splitter $S_{III\,4'}$, which divides the beam with the help of mirror $S_{III\,5}$ onto measuring fields $x_7$ and $x_8$. Light of system IV is directed by means of mirror $S_{IV\,1}$ onto mirror combination $S_{IV\,2}/S_{IV\,3}$, which, in a similar way to mirror combination $S_{II\,2}/S_{II\,3}$, directs the beam to beam splitter $S_{IV\,4'}$, which divides the beam with the help of mirror $S_{IV\,5}$ onto measuring fields $x_1$ and $x_2$. The beams are detected by photovoltaic cells or lens-photodiode systems $DA_{I\,1}$, $DA_{I\,2}$, $DA_{II\,1}$, $DA_{II\,2}$, $DA_{III\,1}$, $DA_{III\,2}$, $DA_{IV\,1}$, $DA_{IV\,2}$ in the region of the measuring fields $x_1$–$x_8$, the Roman indices referring to the scanning beam generating systems I to IV. The arrangement is preferably chosen so that four measuring field pairs $x_1$, $x_2$; $x_3$, $x_4$; $x_5$, $x_6$; $x_7$, $x_8$ are formed, disposed roughly in a circle, where neighbouring measuring field pairs are disposed displaced from each other by an angle of 45°. The measurement object diameters from the angularly displaced measuring fields come about to $d_I = a + x_3 + x_4$.

$d_{II} = a + x_5 + x_6$.

$d_{III} = a + x_7 + x_8$.

$d_{IV} = a = x_1 = x_2$.

$x_1$, to $x_8$, being the respective scanning object sections and a the specified slit spacing.

In the device as per FIG. 7, the luminous power is halved by the beam splitter, which, if laser light is used, is unproblematic.

If slits $D_1$–$D_4$ of slit diaphragm D of scanning beam generating systems I–IV of the device described above are provided with flat receiving diodes, internal and external dimensions can also be determined with the refection method in one measuring operation, i.e. during one revolution of spirally slotted disc DS.

Figures 8, 9:
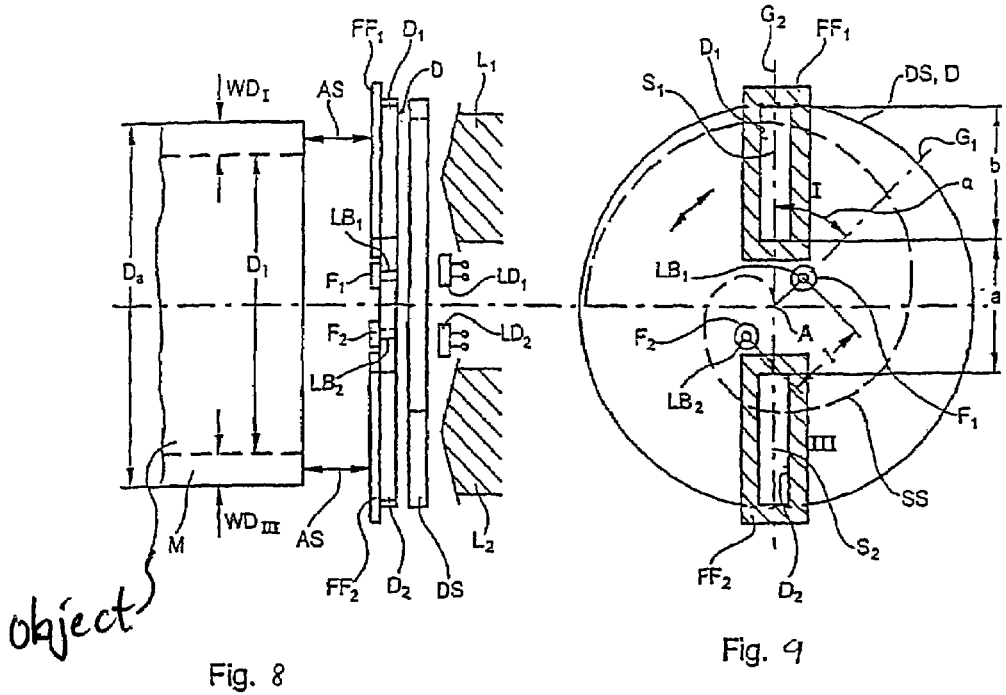
FIG. 8 shows a side view of a further embodiment of the device according to the invention for determining external and internal dimensions.
FIG. 9 shows a top view of the side turned away from the light source (rear view) of the device as per FIG. 8.

FIGS. 8 and 9 show an embodiment of the device, with which, with two scanning beam generating systems I and III, the outside and inside diameters as well as the wall thicknesses of tubes can be measured in one plane.

Generating systems I and III with light sources $L_1$ and $L_2$ generate scanning light beams AS with the scanning direction parallel to axis (A) of spirally slotted disc DS. The scanning light beams strike the front face of a measurement object (M), in this case a tube, see FIG. 8. A slit diaphragm D with slits $D_1$, $D_2$ is disposed, viewed from the direction of illumination, behind spirally slotted disc DS. Slits $D_1$ and $D_2$ are surrounded by flat receiving diodes $FF_1$ and $FF_2$. The scanning light beams of generating systems I and II reflected by the material of the object strike receiving diodes $FF_1$ and $FF_2$ which surround slits $D_1$, $D_2$ and generate during the reflection process output signals with signal duration $t_{1II}$ to $t_{2I}$ and $t_{1III}$ to $t_{2III}$, see FIG. 10.

Figure 10:
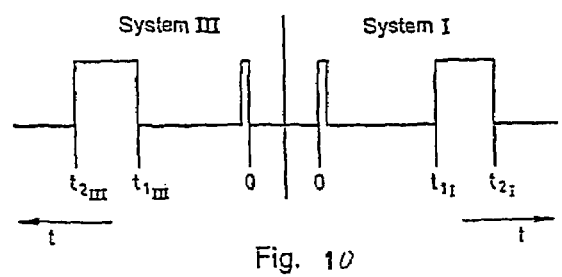
FIG. 10 shows a diagram of the time characteristic of the signals acquired with the device as per FIGS. 8 and 9 during a revolution of the spirally slotted disc.

On a first straight line $G_1$ running at an angle $\alpha$ to a second straight line $G_2$ that joins slits $D_1$, $D_2$ through the axis of rotation A of slit diaphragm D, a hole aperture $LB_1$ and $LB_2$ is formed in the slit diaphragm on each side of the axis of rotation. Hole apertures $LB_1$ and $LB_2$ have a pre-definable spacing $1=a/2-r_{max}/((90-\alpha)/360)$ from axis of rotation A, where $r_{max}$=maximum distance of the spiral slot from the centre of the spiral slot or from axis of rotation A and $\alpha$= specifiable angle between the straight line $G_1$ joining the hole apertures and straight line $G_2$ joining slits $D_1$ and $D_2$. With $\alpha$=45°, the distance $a/2-r_{max}/8$ from the centre point of the spirally slotted disc, where a=distance between slits $D_1$ and $D_2$, see FIG. 9. The hole apertures with the help of spiral slot SS and light diodes $LD_1$ and $LD_2$ generate in photodiodes $F_1$ and $F_2$ electrical pulses that mark the start instant t=0 of the scanning cycles over the slit lengths b of slits $D_1$ and $D_2$. The scanning speed $V_L$ is known through $V_L=r_{max}\cdot n/60$ (meters/second; n is the number of revolutions of the spirally slotted disc per minute, $r_{max}$ in [m]. Start and end of the reflection times are according to FIG. 10 given by $t_{1I}$ and $t_{2I}$ for system I and by $t_{1III}$ and $t_{2III}$ for system III. The aforementioned instants are also end instants of digital pulse counters that have started at t=0 and consequently can, with the totals of their pulses, be displayed as proportional time quantities.

The outside diameter $D_a$, inside diameter $D_i$ and wall thicknesses $WD_I$ and $WD_{III}$ are calculated with the given slit spacing a as follows:

$$D_a = a + V_L(t_{2I} + t_{2III})$$

$$D_i = a + V_L(t_{1I} + t_{1III})$$

$$WD_I = V_L(t_{2I} - t_{1I})$$

$$WD_{III} = V_L(t_{2III} - t_{1III})$$

With additional scanning light beam generating systems, e.g. systems II and IV as per the device described above, additional outside and inside diameters and wall thicknesses can, as described for generating systems I and III, be simultaneously determined in a second measuring plane or second measuring axis of the same plane.

Differing from that described above, the additional light source or light sources $LD_1$, $LD_2$ can be rotated on the common axis of rotation A together with slit diaphragm D, to which it is tightly joined, relative to the spirally slotted disc DS with common angular velocity $\omega_D$. The spirally slotted disc DS rotates at an angular velocity $\omega_{DS}$. From this results for a relative angle of rotation $\phi = \phi_{DS} - \phi_D$. The duration of a complete scanning cycle $t_A$ arises from the maximum relative angle of rotation $\phi = 2\pi$ and the angular velocities $\omega_{DS}$ and $\omega_D$, these being proportional to the rotational speeds $n_{DS}$ and $n_D$ of spirally slotted disc DS and the arrangement of light source/slit diaphragm $LD_1$, $LD_2$, D, to $$t_A = 2\pi/((\omega_{DS} - \omega_D)) = 1/(f_{DS} - f_D)$$

where $f_{DS}$ and $f_D$ are in revolutions/second.

From this, the common angular advance $\phi_U$ of slit diaphragm D and light source $L_{D1}$, $L_{D2}$ during a scanning cycle comes about to $\phi_U = t_A \cdot 360° \cdot f_D$. The measurement object circumference is scanned completely after a time $T_D/m=(1/f_D)/m$, where $T_D=1/f_D$ is the time for a revolution of the slit diaphragm/light source and m is the number of generating systems.

The following describes a specific example:

The speed $n_D$ of the slit diaphragm disc is $n_D$=30 rpm, which corresponds to $f_D$=0.5/sec., i.e. 0.5 rpm The time $T_D$ per revolution is then $T_D$=2 sec. The speed $n_{DS}$ of the spirally slotted disc is $n_{DS}$=6,000 rpm, corresponding to $f_{DS}$=100/sec. The time $T_{DS}$ per revolution is then $T_{DS}$=10 ms. The duration $t_A$ of a scanning cycle then comes about to $t_A$= 1/(100−0.5)=10.05 ms.

The angular advance $\Phi U$ during a scanning cycle in circumferential direction is $$\Phi_U = 10.05 \cdot 10^{-3} \text{ sec} \cdot 360° \cdot 0.5/\text{sec.} = 1.81°$$

The circumference of the object is completely scanned after $T_D/2$=1 sec. since wall thicknesses are measured at two places at the same time. In this time, therefore, wall thicknesses are determined approximately 100 times and outside and inside diameters approximately 50 times.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. Device for measuring external and internal dimensions of and distances between measurement objects, the device comprising:
   a) at least one light source and at least one device for generating a parallel pencil of rays from the light beams of the light source;
   b) at least one slit diaphragm that can be illuminated by the parallel pencil of light rays;
   c) at least one disc disposed in front of or behind the slit diaphragm, in which the slit diaphragm and the disc can move in relation to each other about a common axis, in particular can rotate, said disc having a spiral slot that intersects the slit of the slit diaphragm, the slit having the form of an Archimedean spiral that obeys the equation $r = c \cdot \Delta\phi$, where r is the radius of the spiral, c is the quotient of the light beam or light spot scanning speed $V_L$ and the relative angular velocity $\omega$ between the angular velocity of the slit diaphragm and the angular velocity of the spirally slotted disc and $\Delta\phi$ is the relative angle of rotation between the angle of rotation of the slit diaphragm and the angle of rotation of the disc, the interaction of the slit and the spiral slot creating a hole aperture, which, upon rotation of the disc and/or slit diaphragm at constant speed moves along the slit at constant speed;

d) at least one photoelectric device onto which the light beams passing through the hole aperture and scanning the measurement object are directed, the measurement object being disposed after the hole aperture when viewed in the direction of the light beam;

e) an evaluation device, which is connected in series with the photoelectric device and measures the time in which the light beams scan the measurement object/ objects, and from the measured times determines the external and internal dimensions and distances between measurement object or measurement objects, said dimensions and distances being proportional to these times;

f) there are formed in the slit diaphragm, in front of the spirally slotted disc viewed in the direction of the beam, several slits that are disposed radially around axis of rotation and there is provided for the slits a common light source or there is provided for each slit a separate light source emitting light having one wavelength or light with different wavelengths or light with one wavelength with different frequency modulated light amplitudes;

g) there are provided optical contrivances, which deflect the scanning light beams passing through the hole diaphragms into a common beam plane; and h) there are provided optical contrivances, which separate the scanning light beams scanning the measurement object in the time interval T/m (T=duration of a rotation of the spirally slotted disc, m=number of slits) according to wavelength and direct the scanning light beams onto wavelength sensitive photodiodes, the output signals of which produced in the time interval T/m and being proportional to the shade times $t_d$, that is the times within which the scanning light beams scan the diameter of the measurement object, are fed to the evaluation device; or i) there is provided a photodiode onto which the scanning light beams scanning the measurement object within time interval T/m (T=duration of a rotation of the spirally slotted disc, m=number of slits) with frequency modulated amplitudes are focussed and whose superimposed frequency modulated photodiode currents are fed to frequency filters and low pass filters of the evaluation device for separation of the scanning light flux associated with the generating system so that the signals which are proportional to the shade times $t_d$ are present as output signals.

2. Device according to claim 1, wherein:

a) the optical contrivances for deflecting the scanning light beams into the common beam plane have mirrors and scanning direction changers, which are disposed so that the scanning directions of all scanning light beams are the same;

b) the optical contrivances for wavelength dependent separation of the scanning beams are mirrors with wavelength dependent reflection;

c) the scanning direction changer has an isosceles-rectangular prism onto whose hypotenuse the scanning beam falls perpendicularly, the scanning direction of which is reversed by 180°-deflection of the beam path, the scanning light beam emerging from the prism reversed in scanning direction being directed onto a parallel mirror arrangement by two mirrors inclined to each other at an angle of 90°, said mirror arrangement deflecting the scanning light beam reversed in scanning direction into the plane of the incident scanning light beam;

d) deflecting mirrors arranged in the beam path of a scanning light beam and provided for other scanning light beams are of partially transparent design; and e) the slits of slit diaphragm are radially disposed at the same angular spacing from each other in front of the spirally slotted disc.

3. Device according to claim 1, wherein:

a) in one generating system the measuring plane is generated by the combination of a beam splitter with 50% transmission and a mirror.

4. Device according to claim 1, wherein:

a) the light sources emit light of one wavelength and optical contrivances are provided, which deflect the light beams passing through the hole apertures into a common plane in four axes, four measuring field pairs being formed, whose associated scanning light beams are detected by photovoltaic cells or lens-photodiode systems, whose output signals are fed to the evaluation device, the measuring field pairs being displaced from each other by an angle of 45° and being arranged in a circle.

5. Device according to claim 1, wherein:

a) an increase in the number (m) of generating systems is provided for a combination of an increase in the measuring frequency and the measuring axes of one plane or measuring planes, by multiplying the number (i) of generating systems required for the increase in measuring frequency with the number (j) of generating systems required for the increase in the number of measuring axes of one plane or measuring planes according to the equation m=i·j.

6. Device according to claim 1, wherein:

a) the number (m) of generating systems is increased for an increase in the measuring frequency, said increase in the number of generating systems being achieved by increasing the number (n) of slits starting from the centre point of aperture in a radial and equidistant arrangement, which together with a spiral slot create moving hole apertures for each revolution of disc, and/or by increasing the number of spiral slots arranged at equal distances from each other in spirally slotted disc, the following equation being true:

m=n·k and the number of scans/second=n·k·revolutions/second.

7. Device for measuring external and internal dimensions of measurement objects, especially tubular measurement objects, the device comprising:

a) at least one light source and at least one contrivance for generating a parallel pencil of light rays from the light beams of the light source;

b) at least one slit diaphragm that can be illuminated by the parallel pencil of light rays;

c) at least one disc arranged in front of or behind slit diaphragm, the slit diaphragm and the disc being movable relative to each other about a common axis of rotation, in particular rotatable, and the disc having a spiral slot intersecting the slit of the slit diaphragm, said spiral slot having the form of an Archimedean spiral that obeys the equation r=c ·Δφ, r being the radius of the spiral, c being the quotient of the scanning rate $V_L$ of the light beam or light spot and the relative angular velocity o) between the angular velocity of the slit diaphragm and the angular velocity of the spirally slotted disc and Δφ being the relative angle of rotation between he angle of rotation of the slit diaphragm and the angle of rotation of disc, the interaction of the slit and the spiral slot creating a hole aperture, which, upon rotation of disc and/or slit diaphragm at constant speed, moves along the slit at constant speed;

d) at least one photoelectric device, onto which are directed the light beams passing through the hole aperture and scanning the measurement object and reflected by the measurement object, the measurement object being disposed after the hole aperture viewed in the direction of the light beam;

e) an evaluation device, which is connected in series with the photoelectric device and measures the time in which the light beams scan the measurement object/s and from the measured times determines the external and internal dimensions and distances between measurement object or measurement objects, said dimensions and distances being proportional to the measured times;

f) there are provided at least two systems generating the scanning beams that scan the front faces of the measurement objects with at least two light sources, with a spirally slotted disc with spiral slot and with slit diaphragm disposed behind the spirally slotted disc viewed in the direction of the light beam, with at least two radially extending slits;

g) the slits have a specifiable length (b) and in a radial direction a specifiable spacing (a) from each other;

h) the slits are radially aligned with each other and two slits each are disposed diametrically opposed to each other in respect of the axis of rotation;

i) the slits are each surrounded by receive diodes (photodiodes) on the side turned away from the light sources, scanning light beams reflected from the front face of the measurement object falling onto said photodiodes, the signals of which define the start of reflection times and end of reflection times;

j) on a first straight line running at an angle α to a second straight line joining the slits and through the axis of rotation of slit diaphragm, hole apertures and are created in the slit diaphragm on each side of the axis of rotation;

k) hole apertures have a specifiable spacing $l=a/2-r_{max}/((90-\alpha)/360)$ from the axis of rotation, where $r_{max}=$ maximum spacing of the spiral slot from the centre point of the spiral or from the axis of rotation and α=specifiable angle between the first straight line joining the hole apertures and the second straight line joining the slits;

l) at the light source end is arranged at least one further light source for illuminating the hole apertures;

m) on the side of the hole apertures turned away from the light source, photodiodes are arranged onto which falls the light passing through the hole apertures, the output signals of said photodiodes defining the start times of the scanning cycles by means of the slit length of slits; and n) the additional light source is formed by two light emitting diodes, each of which is associated with one hole aperture.

8. Device according to claim 7, wherein:

a) the evaluation device determines the outside diameter $D_a$, the inside diameter $D_i$, and the wall thicknesses $WD_I$, and $WD_{III}$, of tubular measurement objects from the specified spacing (a) of the slits of slit diaphragm, the light beam or light spot scanning speed $V_L$ and the instants detected by receive diodes of the start of reflection ($t_{1I}$, $t_{1III}$) and end of reflection ($t_{2I}$, $t_{2III}$) according to the following formula:

$D_a = a + V_L \cdot (t_{2I} + t_{2III})$ $D_i = a + V_L (t_{1I} + t_{1III})$ $WD_I = V_L \cdot (t_{2I} + t_{1I})$ $WD_{III} = V_L \cdot (t_{2III} + t_{1III})$ where $V_L = r_{max} \cdot n/60$ [m/sec] and n=number of revolutions/minute and $r_{max}$=maximum spacing of the spiral slot from the centre of the spirally slotted disc.

9. Device according to claim 7, wherein:

a) the test device including the generating systems, the additional light sources and the photodiodes is rotatable as a whole about the axis of rotation.

10. Device according to one of the claim 7, wherein:

a) the additional light source is rotatable on common axis with slit diaphragm, to which it is tightly joined, relative to the spirally slotted disc at the common angular velocity $\omega_D$, the spirally slotted disc being rotatable at an angular velocity $\omega_{DS}$, so that $\Phi = \Phi_{DS} - \Phi_D$ is true for the relative angle of rotation, the duration of a complete scanning cycle $t_A$ comes about from the maximum relative angle of rotation $\Phi = 2\pi$ and the angular velocities $\omega_{DS}$ and $\omega_D$, these being proportional to the rotational speeds $n_{DS}$ and $n_D$ (revolutions/min) of the spirally slotted disc and the light source/slit diaphragm arrangement, to $t_A = 2\pi/(\omega_{DS} - \omega_D) = 1/(f_{DS} - f_D)$ where $f_{DS}$ and $f_D$ are in revolutions/second, so that the common angular advance $\Phi_U$ of slit diaphragm and light source during a scanning cycle is $\Phi_U = t_A \cdot 360° \cdot f_D$ and the circumference of the measurement object is completely scanned after a time $T_D/m = (1/f_D)/m$, $T_D = 1/f_D$ being the time for a revolution of the slit diaphragm/light source and m being the number of generating systems.

* * * * *